United States Patent [19]

Killinger

[11] Patent Number: 5,010,319
[45] Date of Patent: Apr. 23, 1991

[54] WARNING LIGHT DEVICE

[75] Inventor: Erich Killinger, Gaggenau, Fed. Rep. of Germany

[73] Assignee: Dambach-Werke GmbH, Fed. Rep. of Germany

[21] Appl. No.: 416,061

[22] Filed: Oct. 2, 1989

[30] Foreign Application Priority Data

Oct. 1, 1988 [DE] Fed. Rep. of Germany ....... 3833544

[51] Int. Cl.$^5$ .............................................. B60Q 1/26
[52] U.S. Cl. .................... 340/472; 340/468; 340/815.31; 362/80; 40/547
[58] Field of Search ............... 340/468, 470, 472, 473, 340/487, 471, 815.06, 815.07, 815.31, 795, 908, 908.1, 693; 40/592, 547; 362/80

[56] References Cited

U.S. PATENT DOCUMENTS

| | | | |
|---|---|---|---|
| 3,622,980 | 11/1971 | Elledge, Jr. .................... | 340/908 X |
| 3,761,890 | 9/1973 | Fritts et al. ........................ | 40/592 X |
| 3,962,702 | 6/1976 | Kriege ............................ | 340/815.31 |
| 4,152,854 | 5/1979 | Berry, Jr. et al. ................. | 40/592 X |
| 4,361,828 | 11/1982 | Hose ..................................... | 340/468 |
| 4,662,095 | 5/1987 | Higgins ................................ | 40/592 |
| 4,811,172 | 3/1989 | Davenport et al. .............. | 362/80 X |
| 4,845,600 | 7/1989 | Matsumura et al. .................. | 362/80 |

FOREIGN PATENT DOCUMENTS 1507883 4/1978 United Kingdom .................. 40/547
2051447 1/1981 United Kingdom .................. 40/547

Primary Examiner—Joseph A. Orsino
Assistant Examiner—Brian R. Tumm
Attorney, Agent, or Firm—Thomas W. Speckman; Douglas H. Pauley

[57] ABSTRACT

A warning light device having a directional warning panel to regulate traffic, which is attached in a vertical position near the rear of a vehicle. The warning light device displays traffic symbols for following traffic, with controllable electric luminous elements. An autonomous, mobile warning light device with great versatility of display is provided since the warning panel includes a controllable optical fiber display matrix having a plurality of traffic symbols. The warning light device is attached or attachable to the roof, extending as far as the rear, of a motor vehicle. Power is supplied to the warning light device with an electric power supply system of the motor vehicle or a supplementary electric power pack mounted in the motor vehicle. An operating panel is disposed near the dashboard of the motor vehicle, or is built into the dashboard, and has operating elements for switching the warning light device on and off. The operating panel also initiates the displays of various traffic symbols on the optical fiber display matrix. The operating panel, the power supply and the fiber optic display matrix are interconnected with connecting cables installed within the motor vehicle.

6 Claims, 6 Drawing Sheets

WARNING LIGHT DEVICE

BACKGROUND OF THE INVENTION

1. Field of the Invention invention relates to a warning light device having a directional warning panel, used to regulate traffic, which is attached in a vertical position near the rear of a vehicle. Traffic symbols can be displayed on the warning panel with controllable electrical luminous elements, so that the traffic symbols are apparent to following traffic.

2. Description of the Prior Art

A warning light device of this type is known from German Patent 34 34 341. Such known warning light device has a vertical panel with colored stripes and electric lights mounted on it in the form of an arrow display. A standard traffic symbol is also fastened to the lower part of the panel. The lights are secured on a rotatably supported, arrow-shaped holder, so that the arrow display can be adjusted to point downward to the left or downward to the right. The warning light device is mounted on a trailer and can be hitched to a motor vehicle that can supply power and control to the warning light device. Normally, such warning devices are set up at construction sites and have electric power supplied directly from an alternating current grid via installed current supply cables.

However, such known warning light devices are limited to displaying traffic symbols secured to them, along with the adjustable illuminated arrow pointing to the right or left. Furthermore, such warning light devices are unsuited for use with a heavy-load truck or the like, because the traffic symbol cannot be seen by drivers in moving traffic until just before they arrive at the warning light device.

SUMMARY OF THE INVENTION

It is one object of the present invention to provide an improved warning light device of the type referred to above for use with a heavy-load truck or the like, to provide displayed traffic symbols that are more accurately seen by persons in following traffic, and to provide an increased number and type of displays.

According to this invention, the objects are attained by having a warning panel with a controllable optical fiber display matrix having a plurality of traffic symbols. The warning panel is attached or attachable to the roof, extending continuously as far as the rear, of a motor vehicle. An electric power supply system of the motor vehicle or a supplementary electric power pack accommodated in the motor vehicle supplies power to the warning panel. An operating panel is disposed near the dashboard of the motor vehicle, or is built into the dashboard. The operating panel has operating elements for switching the warning light device on and off and for initiating the displays, of various traffic symbols, on the optical fiber display matrix. The operating panel, power supply and optical fiber display matrix are connected or connectable to one another through connecting cables installed within the motor vehicle.

The warning light device is incorporated into a motor vehicle and can therefore easily follow any heavy-load truck. The traffic symbols displayed are located at a relatively great distance from the road surface, so that even from behind a long line of vehicles they can be readily seen from vehicles far away. All the controls and the electrical power supply are integrated in the motor vehicle, making the warning light device an autonomous, mobile unit that is ready for use at any time. The use of an optical fiber display matrix makes it easy to display a plurality of accurately represented traffic symbols, such as arrows to indicate the direction of travel, speed limit signs, and the like. Such traffic symbols can be adapted to the traffic situation at any time, even en route, by the driver of the motor vehicle. All that is needed are suitable control signals which are provided by the operating panel disposed or installed near the dashboard.

The display of various traffic symbols on the warning panel is obtained with an optical fiber display matrix that has a plurality of optical fiber bundles, which can be illuminated through individually triggerable light sources. The free ends of the individual optical fibers of the optical fiber bundles, near the optical fiber display matrix, terminate in an assigned position thereby defining various traffic symbols.

According to one embodiment of this invention, the structural design of the optical fiber display matrix is selected such that the optical fiber display matrix comprises a panel with light-emitting pixels, which are each connectable to one end of an optical fiber. The optical fibers that are assigned to a traffic symbol or to one color of the traffic symbol are joined into an optical fiber bundle which can be illuminated individually. The optical fiber bundles are assigned individual light sources and/or color filters.

According to one embodiment of this invention, the optical fiber display matrix is accommodated in a housing. The housing is pivotally connected transversely to a vehicle axis, onto a rooftop stand construction connectable to the motor vehicle. The housing can be folded toward the front of the vehicle and down onto the roof making it easy to put the optical fiber display matrix into a storage position, in which the display can no longer be seen.

For optical reasons and reasons of wind resistance, a pivotally attached spoiler is used to cover the optical fiber display matrix when folded onto the roof and when in the operating position. The cross section of the spoiler converges toward the front of the vehicle.

In another embodiment of this invention where the warning panel is used with an accompanying vehicle, the optical fiber display matrix, the rooftop stand construction and the spoiler are firmly attached to the motor vehicle, and the connecting leads are hardwired and permanently installed in the motor vehicle.

BRIEF DESCRIPTION OF THE DRAWINGS

This invention will be described in detail in terms of exemplary embodiments shown in the drawings wherein.

DESCRIPTION OF THE PREFERRED EMBODIMENTS

Figure 1:
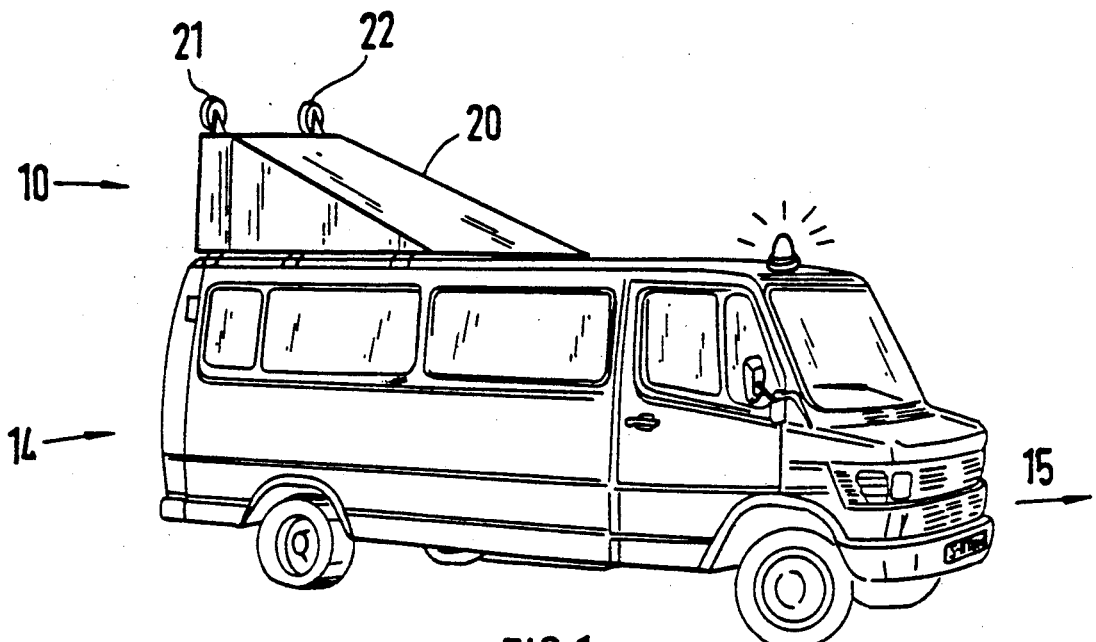
FIG. 1 shows a perspective side view of a warning light device mounted on a motor vehicle.
Figure 2:
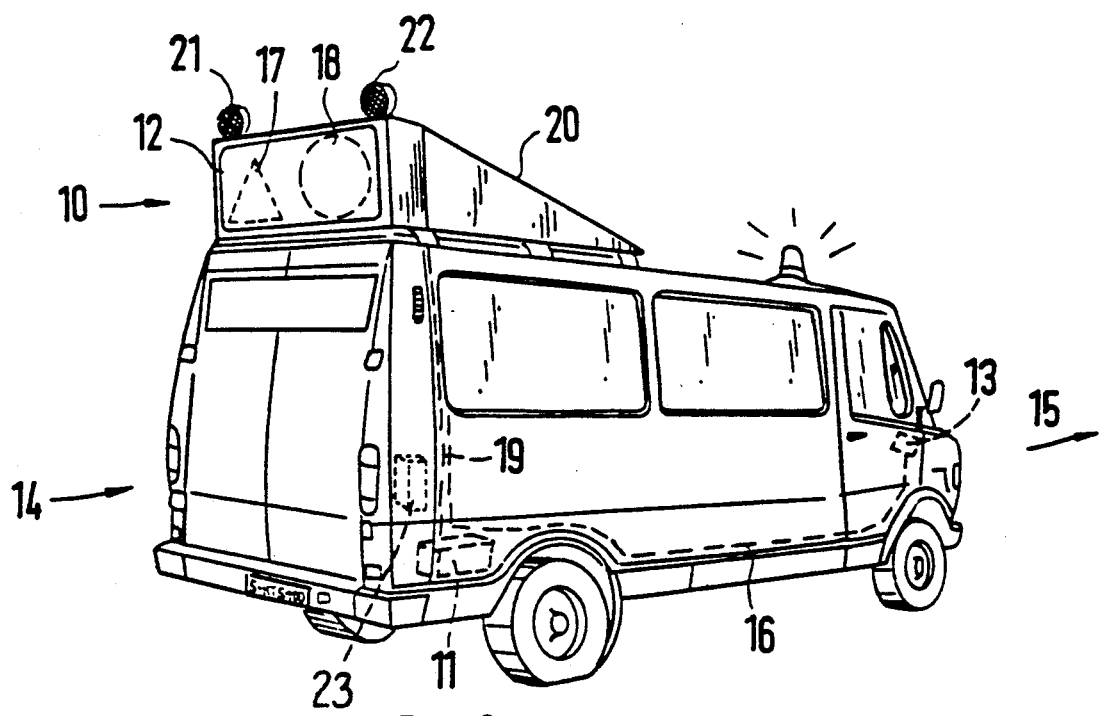
FIG. 2 shows the motor vehicle as shown in FIG. 1 in a different perspective side view.

FIGS. 1 and 2 show a warning light device 10 having an optical fiber display matrix 12, used as a means of regulating traffic.

The optical fiber display matrix 12 is disposed in a vertical position on the rear of a motor vehicle 14 traveling in the direction of travel, as shown by arrow 15, and can display traffic symbols 17 and 18 for following traffic, by means of controllable luminous elements. The warning light device 10 is accommodated in a housing 20, on the upper and horizontally extending edge of which two further signal devices 21 and 22 are disposed.

Figure 3:
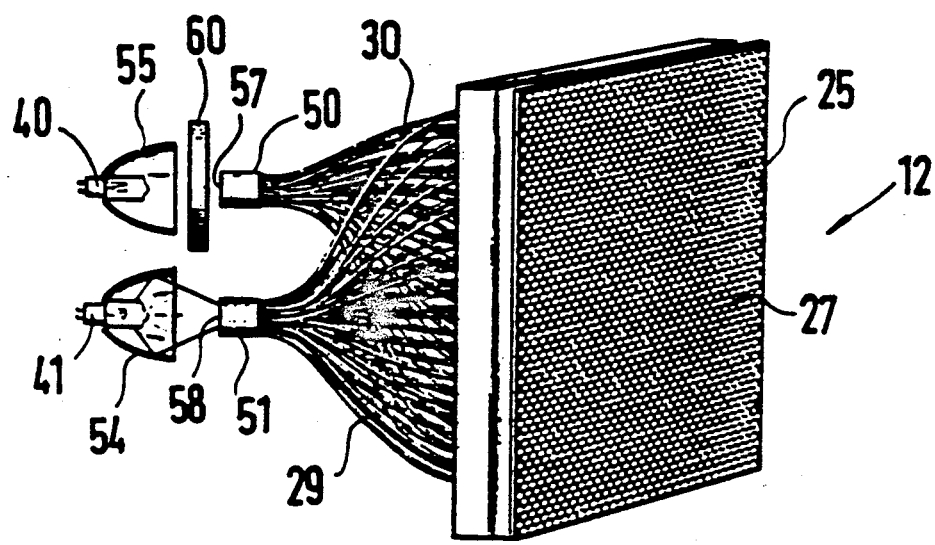
FIG. 3 shows a perspective view of a panel having two optical fiber bundles and two light sources for displaying two different traffic symbols.
Figure 4:
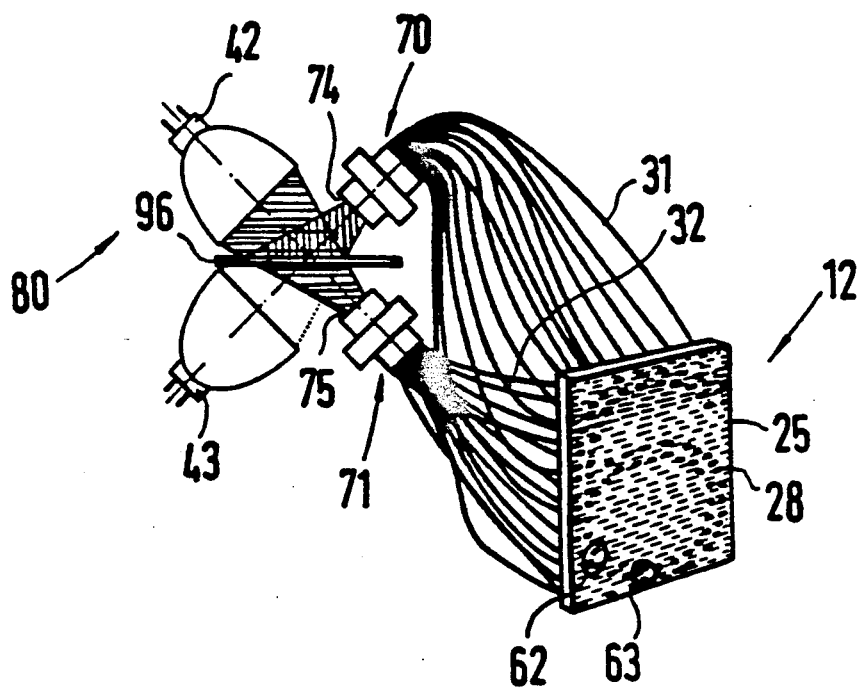
FIG. 4 shows a perspective view of a panel having two optical fiber bundles and two light sources for displaying a two-colored traffic symbol.

As shown in FIGS. 3 and 4, the optical fiber display matrix 12 comprises a panel 25, such as a matrix, with light-emitting pixels 27 and 28, in which one set of ends of optical fibers 29–32 is disposed. The other ends of the optical fibers 29–32 are illuminated by light sources 40–43, such as halogen lamps. Optical fibers 29 and 30, which are assigned to one traffic symbol in the panel 25, are each joined together into a multi-armed optical fiber bundle 50 and 51. The light sources 40 and 41 are each located in a concave mirror 55 and 54, respectively, so that the emitted light directly strikes the ends 57 and 58 of the optical fiber bundles 50 and 51. FIG. 3 shows that a light filter 60 is disposed between the light source 40 and the end 57 of the optical fiber bundle 50.

FIG. 4 shows that the symbol, shown as a numeral 6, shown on the panel 25 comprises groups of pairs 62, 63 of pixels, such that one pixel of each of the groups of pairs 62 and 63 belongs to the first optical fiber bundle 70, while the other pixel of the groups of pairs 62 and 63 belongs to the second optical fiber bundle 71. The two free ends 74 and 75 of the optical fiber bundles 70 and 71 are illuminated by the light sources 42 and 43. In the particular embodiment shown, the two free ends 74 and 75 of the optical fiber bundles 70 and 71 are connected to a lighting unit 80, which comprises the two light sources 42 and 43.

Figure 5:
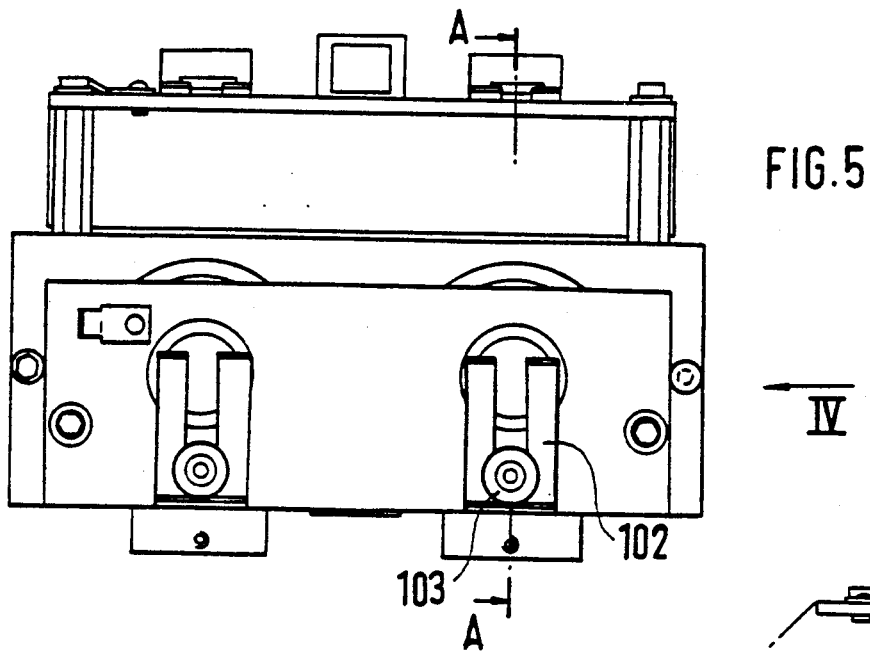
FIG. 5 shows a rear view of a portion of a columnar lighting fixture.
Figure 6:
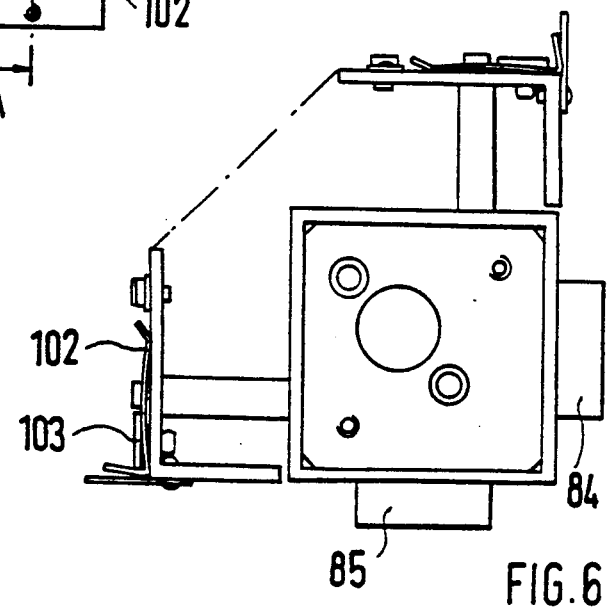
FIG. 6 shows a side view of the columnar lighting fixture, in the direction of the arrow IV as shown in FIG. 5.
Figure 7:
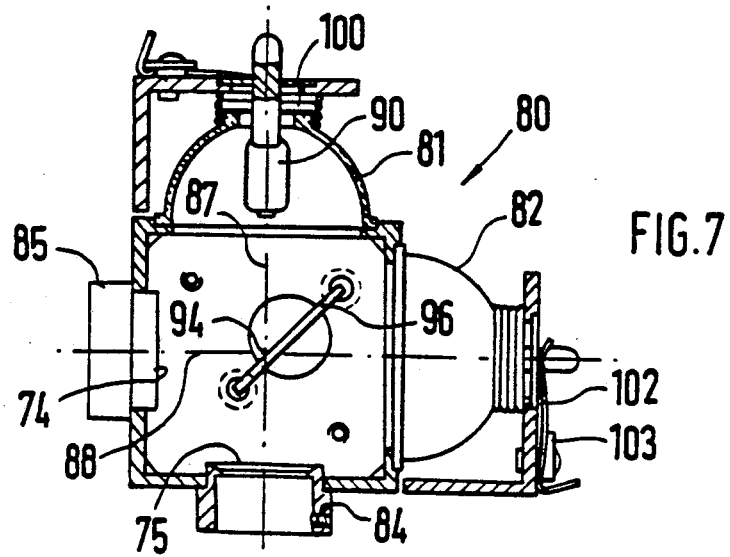
FIG. 7 shows a sectional view taken along the line A—A, as shown in FIG. 5.

As FIGS. 5, 6 and 7 show, the lighting unit 80 comprises a housing in the interior of which two concave mirrors 81 and 82 are disposed. The housing has connection fixtures 84 and 85 for the optical fiber bundles which are not shown in further detail. The concave mirror 81 is disposed coaxially with the connection fixture 84, while the concave mirror 82 extends coaxially with the connection fixture 85. The axes 87 and 88 of the concave mirrors 81 and 82, respectively, define a common plane and intersect at an angle of 90°. It can be seen that the light source 90 is a point source, which is disposed in the focal point of the concave mirror 81 or 82, respectively.

A semitransparent mirror 96 is disposed near the point 94 of intersection of the axes 87 and 88 and is disposed at a right angle to the plane defined by the two axes 87 and 88 and is intersected by the axes 87 and 88 at an angle of 45°. 50% of the light rays of the two point light sources pass through the semitransparent mirror 96 to reach the entry faces 74 and 75 of the optical fiber bundles, not shown in further detail, that form the symbol. If one point light source fails, the other point light source 90 is switched on, and in the same way illuminates the two optical fiber bundles 70 and 71. The display can be made multi-colored, by placing a suitable color filter before the entry face of one of the two optical fiber bundles 74 and 75. If especially high luminous intensities are required, for instance in fog, then the brightness of the symbol can be doubled by switching both point light sources on simultaneously.

The lighting unit 80, as it is shown in FIGS. 5, 6 and 7, can be combined to make a columnar lighting fixture, which is then accommodated in the housing 20. FIGS. 5, 6 and 7 also show that the point light sources 90 are disposed in sockets 100 and are retained by prestressed spring elements 102. The spring elements 102 are connected with rivets 103 to the lighting unit 80.

FIG. 3 shows that the ends of the optical fibers 29 and 30 in the panel 25 are disposed such that a twocolored traffic symbol, or two different traffic symbols, can be displayed, see also FIG. 2. The ends of the optical fibers 29–32 terminating in the panel 25 conically diverge toward their ends and are counter sunk in the individual holes in the panel 25. The pixels 27 and 28 have a diameter of approximately 4 mm. In the panel 25, the optical fibers 29–32, respectively, are connected by means of spreader sleeves, which are not shown in detail. For a two-colored traffic symbol, the optical fibers 29 and 30 can be distributed over the entire panel 25, while for two different traffic symbols the optical fibers 29 and 30 are distributed over separate regions of the panel 25.

The lighting units shown in FIGS. 5, 6 and 7 are connected to the housing 20 in a vibration-free manner and are electrically connected to the interior of the motor vehicle with electrical connecting leads 16 and 19. From there, the lighting units or columnar lighting fixtures can be controlled, specifically through the operating panel 13, which can be built into the dashboard. Power can be supplied through the electrical power supply system 11 of the motor vehicle 14 or by an additional power supply or supplementary electric 23 power pack which is also accommodated in the motor vehicle 14. The connecting leads 16 and 19 interconnect the operating panel 13, the power supply system 11 and the optical fiber display matrix 12. The optical fiber display matrix 12 can be permanently connected to the motor vehicle 14, and the connecting leads 16 and 19 can also be permanently installed and connected in the motor vehicle 14, as shown in FIG. 2.

It is also possible to equip all the pixels 27 and 28 of the panel 25 with optical fibers and to join the other ends in such a way that they are simultaneously illuminated by the same point light source. If a filter having a certain shape and property is then placed between the point light source and the free ends, certain ends of the optical fibers will not be illuminated, and thus only some of the optical fibers will carry light to the panel. This has the advantage that the desired traffic symbol can be displayed with the selection of certain filters. A light source of suitable capacity is required in such embodiment.

Figure 8:
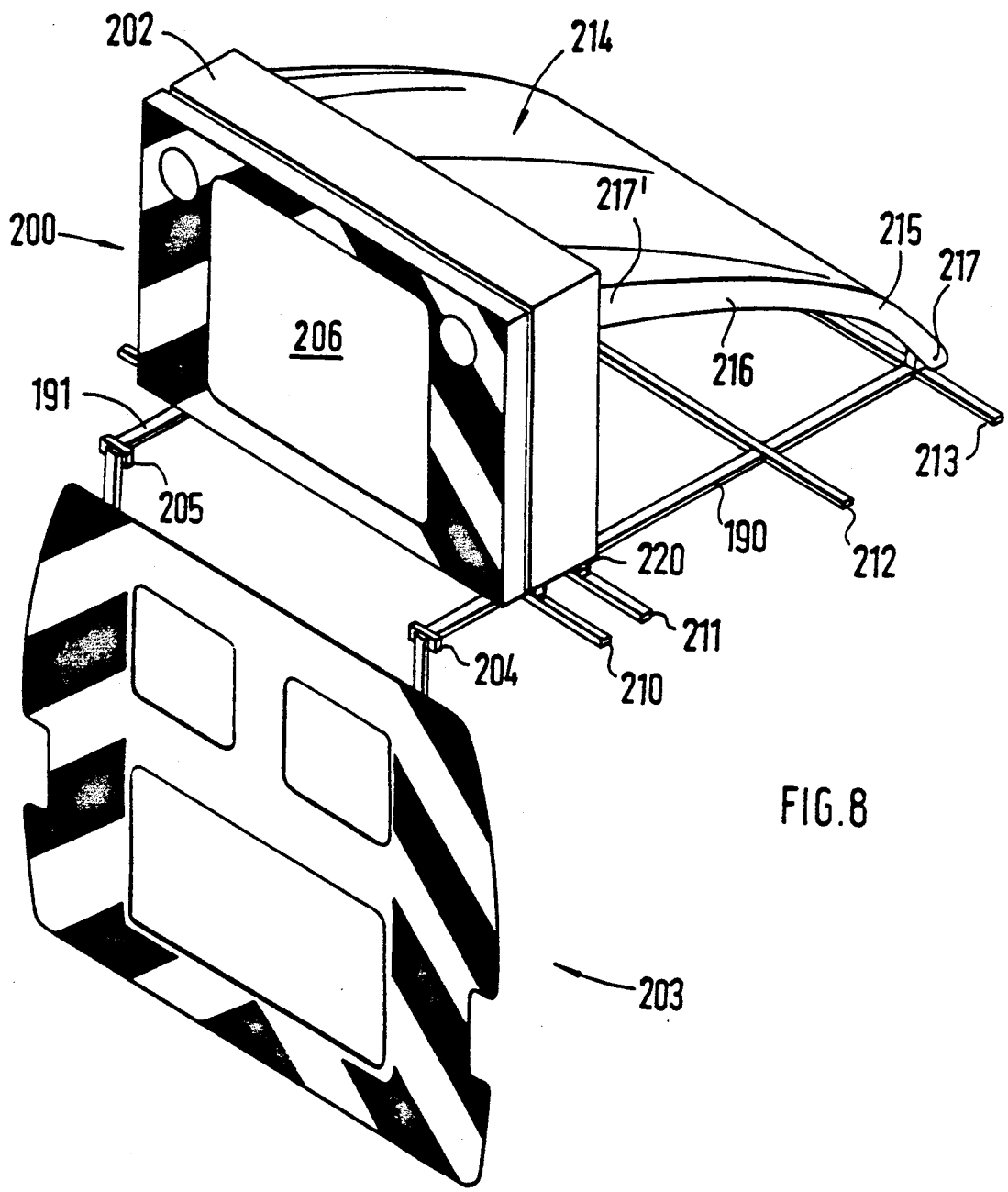
FIG. 8 shows a perspective view of another embodiment of a warning light device with a rooftop stand construction.

FIG. 8 shows a warning light device 200 comprising a variable-message traffic sign which is disposed in a holder 202 and is supported by a rooftop stand construction comprising struts 190, 191 and 210–213. This rooftop stand construction can be detachably connected to the roof of the motor vehicle 14. The warning light device 200 is joined to a spoiler 214. Both the spoiler 214 and the warning light device 200 are pivotally connected about the pivot shaft 217 and 220, and are connected to the rooftop stand construction.

Figure 10:
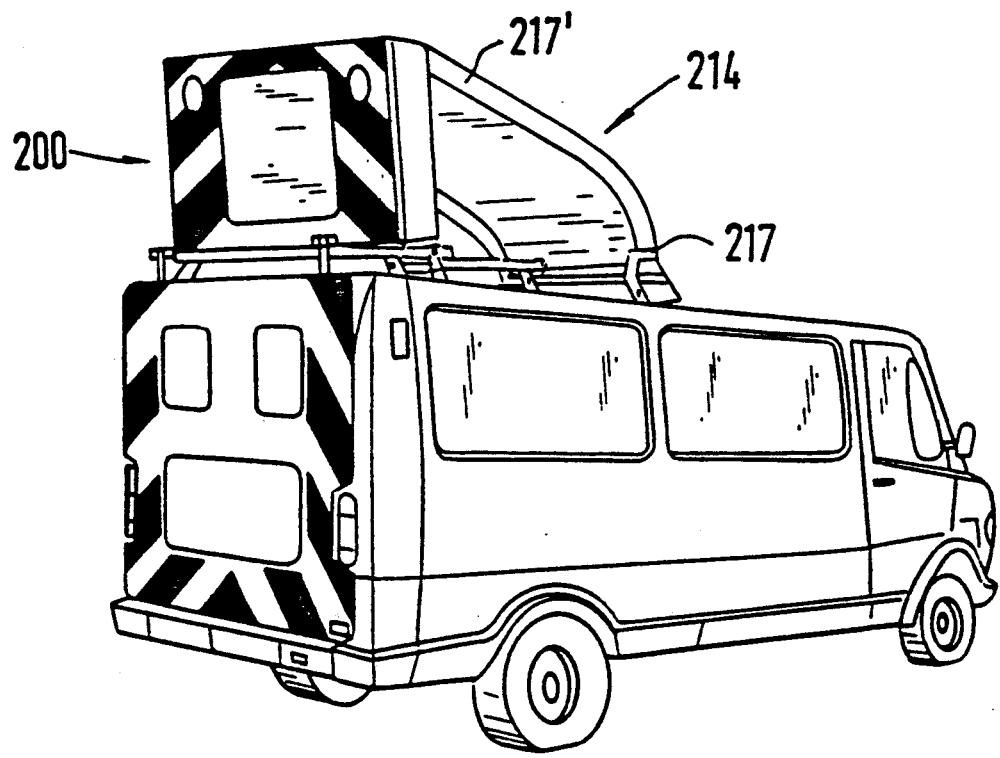
Figure 12:
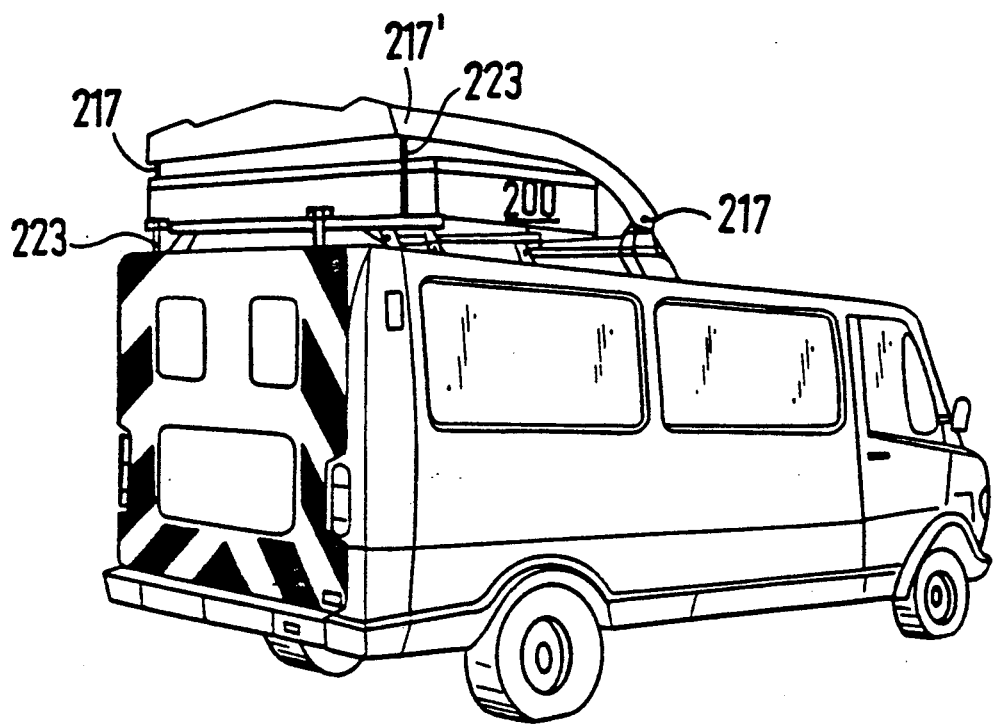

The pivot shaft 220 is mounted such that the warning light device 200 is displaceable transversely to the direction of travel of the motor vehicle 14, and can be locked in place. The spoiler 214 has an approximately plane segment 216, which merges with a curved segment 215. The free ends of the struts 190 and 191 are connected via pivots 204 and 205 to a plate 203 having perforations. The plate 203 at least partially covers the rear of the vehicle, as shown in FIGS. 10 and 12. The segment 206 of the warning light device 200 displaying the traffic symbol is constructed, in terms of its light output, similarly to or identically to the optical fiber display matrix 12 as shown in FIGS. 3 and 4.

Figure 11:
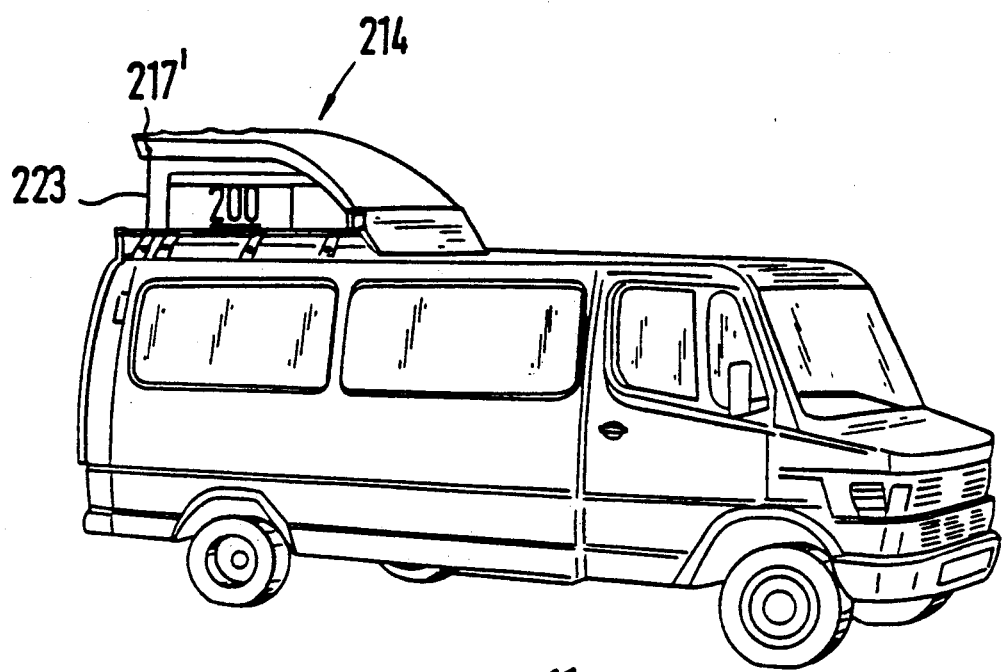
FIGS. 11 and 12 show perspective views of the motor vehicle shown in FIGS. 9 and 10, with the warning light device in the storage position.

In the vicinity of the support posts 223, shown in FIGS. 11 and 12, the spoiler 214 can be folded down about the pivot shaft 217.

Figure 9:
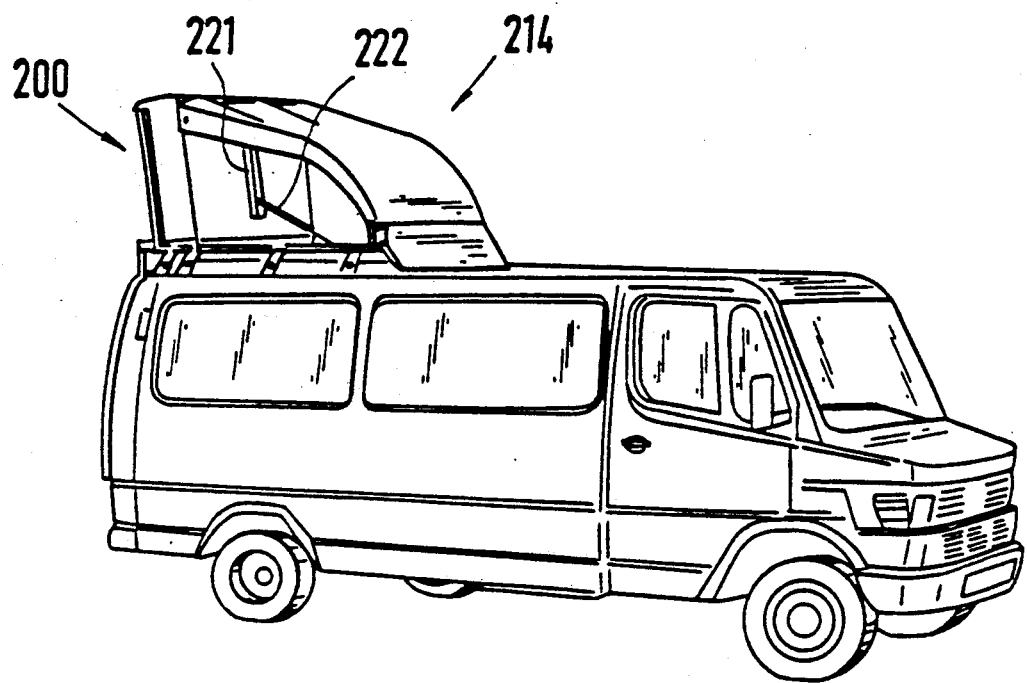
FIGS. 9 and 10 shows a motor vehicle, in two different perspective side views, having the warning light device as shown in FIG. 8.

In FIGS. 9 and 10, the warning light device 200 shown in FIG. 8 is shown in an operating position. Adjusting post 222 is used to stabilize and to adjust the angle of the warning light device 200. One end of adjusting post 222 is pivotally connected to the rooftop stand construction, while the other end of adjusting post 222 is adjustable in a vertically extending groove 221 that is mounted on the back of the warning light device 200.

FIGS. 11 and 12 show the warning light device 200 in the storage position. The warning light device 200 is positioned with its back on the rooftop stand construction and is covered by the spoiler 214. A control motor, not shown, is provided for extending and retracting the warning light device 200, so that all operation can be done from the driver's cab of the motor vehicle 14, through the operating panel 13 which is built into the dashboard.

I claim:

1. A warning light device having a warning panel (25), for regulating traffic, attached in a vertical position near a rear of a motor vehicle and various traffic symbols being displayed on said warning panel (25) with controllable electric luminous elements, the warning light device comprising: said warning panel (25) having a controllable optical fiber display matrix (12), said matrix having a plurality of optical fiber bundles (50, 51) illuminated at one end by individually triggerable light sources (40–43) to define said various traffic symbols, and said optical fiber bundles (50, 51) at their opposite ends having free ends of individual optical fibers (29–32) near said optical fiber display matrix (12), said free ends terminating in positions to display said various traffic symbols (17, 18), said warning panel (25) being attached to a roof of and extending to said rear of said motor vehicle (14);

at least one of an electric power supply system (11) of said motor vehicle (14) and a supplementary electric power pack (23) mounted in said motor vehicle (14) for supplying power to the warning light device (10), an operating panel (13) disposed near a dashboard of said motor vehicle (14) for switching the warning light device (10) on and off and for initiating displays of said various traffic symbols (17, 18) on said optical fiber display matrix (12);

said operating panel (13), at least one of said electric power supply system (11) and said supplementary electric power pack (23), and said optical fiber display matrix (12) being connected through connecting cables (16, 19) installed within said motor vehicle (14); and a spoiler (214) pivotally attached to a rooftop stand construction, remote from a swivel shaft of a holder (202), said spoiler (214) covering said optical fiber display matrix (12) which is folded onto said roof both in an operating position and in a folded-down position, with a cross section of said spoiler (214) converging toward a front of said motor vehicle (14).

2. A warning light device according to claim 1, wherein said optical fiber display matrix (12) with said rooftop stand construction and said spoiler (214) is secured to said motor vehicle (14), and said connecting cables (16, 19) are hardwired and permanently installed in said motor vehicle (14).

3. A warning light device according to claim 1, wherein said optical fiber display matrix (12) comprises said warning panel (25) having light-emitting pixels (27, 28) each connected to one end of each of a plurality of said optical fibers (29, 30; 31, 32), said optical fibers (29, 30) assigned to at least one of said various traffic symbols and one color of said various traffic symbols are joined into one of said plurality of optical fiber bundles (50, 51) which is individually illuminable, and said optical fiber bundles (50, 51) are assigned at least one of said individually triggerable light sources (40, 43) and color filters.

4. A warning light device according to claim 3, wherein said optical fiber display matrix (12) is mounted in a housing (20) which is pivotally connected transverse to a vehicle axis onto said rooftop stand construction connectable to said motor vehicle (14), and said housing (20) can be folded toward a front of said motor vehicle (14) down onto said roof.

5. A warning light device according to claim 4, wherein said optical fiber display matrix (12) with said rooftop stand construction and said spoiler (214) is secured to said motor vehicle (14), and said connecting cables (16, 19) are hardwired and permanently installed in said motor vehicle (14).

6. A warning light device according to claim 1, wherein said optical fiber display matrix (12) is mounted in a housing (20) which is pivotally connected transverse to a vehicle axis onto said rooftop stand construction connectable to said motor vehicle (14), and said housing (20) can be folded toward a front of said motor vehicle (14) down onto said roof.

* * * * *